(12) United States Patent
Herring et al.

(10) Patent No.: US 9,524,097 B2
(45) Date of Patent: Dec. 20, 2016

(54) TOUCHSCREEN GESTURES FOR SELECTING A GRAPHICAL OBJECT

(75) Inventors: Dean F. Herring, Youngsville, NC (US); Brad M. Johnson, Raleigh, NC (US); Adrian X. Rodriguez, Durham, NC (US); Jeffrey J. Smith, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 830 days.

(21) Appl. No.: 13/334,369

(22) Filed: Dec. 22, 2011

(65) Prior Publication Data

US 2013/0167062 A1 Jun. 27, 2013

(51) Int. Cl.
G06F 3/0488 (2013.01)

(52) U.S. Cl.
CPC . *G06F 3/04883* (2013.01); *G06F 2203/04806* (2013.01)

(58) Field of Classification Search
USPC ............. 715/773, 821, 823, 856, 857, 858, 860,715/863; 345/157, 173; 382/122
See application file for complete search history.

(56) References Cited

U.S. PATENT DOCUMENTS

| | | | |
|---|---|---|---|
| 4,680,577 A * | 7/1987 | Straayer et al. | 345/160 |
| 5,543,591 A * | 8/1996 | Gillespie et al. | 178/18.03 |
| 5,612,719 A * | 3/1997 | Beernink et al. | 345/173 |
| 7,254,775 B2 * | 8/2007 | Geaghan et al. | 715/701 |
| RE40,153 E * | 3/2008 | Westerman et al. | 345/173 |
| 7,924,271 B2 | 4/2011 | Christie et al. | |
| 8,077,153 B2 * | 12/2011 | Benko et al. | 345/173 |
| 8,239,784 B2 * | 8/2012 | Hotelling et al. | 715/830 |
| 8,269,736 B2 * | 9/2012 | Wilairat | 345/173 |
| 8,312,387 B2 * | 11/2012 | Williams et al. | 715/800 |
| 8,350,820 B2 * | 1/2013 | Deslippe et al. | 345/173 |
| 8,359,543 B2 * | 1/2013 | Sengupta | 715/773 |
| 2005/0057524 A1* | 3/2005 | Hill et al. | 345/173 |
| 2006/0097991 A1* | 5/2006 | Hotelling et al. | 345/173 |
| 2006/0244735 A1* | 11/2006 | Wilson | 345/173 |
| 2007/0252821 A1* | 11/2007 | Hollemans et al. | 345/173 |
| 2008/0136785 A1* | 6/2008 | Baudisch et al. | 345/173 |
| 2008/0165141 A1* | 7/2008 | Christie | 345/173 |
| 2009/0085878 A1* | 4/2009 | Heubel et al. | 345/173 |
| 2009/0167700 A1* | 7/2009 | Westerman et al. | 345/173 |
| 2009/0231291 A1* | 9/2009 | Ko et al. | 345/173 |
| 2009/0243998 A1* | 10/2009 | Wang | 345/156 |
| 2010/0257447 A1* | 10/2010 | Kim et al. | 715/702 |

(Continued)

OTHER PUBLICATIONS

Ni et al., "Tech-note: rapMenu: Remote Menu Selection Using Freehand Gestural Input", Dept. of Computer Science and Center for Human Computer Interaction, Virginia Tech, 4 pages.

*Primary Examiner* — Maryam Ipakchi
(74) *Attorney, Agent, or Firm* — Jeffrey L. Streets (57) ABSTRACT

A two-finger selection method is implemented on a touchscreen of an electronic device. One embodiment involves sensing the touch positions of two fingers on the touchscreen. In response to sensing the two simultaneous touch positions, a selection graphic is displayed and dynamically positioned on the touchscreen as a function of the two touch positions. A specific graphical object, such as a command button having an associated function, is selected in response to a separate selection input received while the selection graphic is positioned on the specific graphical object.

18 Claims, 5 Drawing Sheets

(56) References Cited

U.S. PATENT DOCUMENTS

2010/0275163 A1* 10/2010 Gillespie et al. ............. 715/810
2010/0299595 A1* 11/2010 Zalewski et al. ............. 715/702
2011/0157053 A1   6/2011 Webb et al.
2011/0175822 A1   7/2011 Poon et al.
2012/0192116 A1*  7/2012 Stedman et al. ............. 715/863

* cited by examiner

TOUCHSCREEN GESTURES FOR SELECTING A GRAPHICAL OBJECT

BACKGROUND

Field of the Invention

The present invention relates to touch-sensitive display screens and interactive touchscreen gestures.

Background of the Related Art

The advent of the personal computer (PC) in the latter half of the twentieth century led to the widespread use of electronic devices to digitally store and process information. The technologies used in computers and other electronic devices have continued to advance, aided by economies of scale, and with ongoing reinvestment in product research and development. Factors such as increasing miniaturization and related improvements in memory density and processor speed, along with vastly improved electronic displays and user input peripherals, have led to the development of many different electronic consumer products. Modern electronic devices are now capable of storing large amounts of information in digital form, even on very compact, portable devices. Popular portable electronic devices with built-in or otherwise connected touchscreens currently include laptop computers, tablet computers, smartphones, digital music players, and handheld electronic game consoles.

Portable electronic computers, such as smartphones and tablet computers, increasingly incorporate a touch-sensitive display screen ("touchscreen") as the primary input device. A touchscreen is an interactive visual display that functions as both an input device and an output device. A touchscreen combines the visual output of a display screen with circuitry that allows for electronic input responsive to touching a display area of the touchscreen. One reason touchscreens are commonly used on portable electronic devices is that they reduce or eliminate the need for mechanical input elements, such as a physical keyboard. Reducing the number of mechanical parts increases the reliability and portability of these devices, while reducing cost. However, the use of touchscreens on compact electronic devices presents some unique challenges, such as how to select items like virtual buttons that appear tiny when scaled down to fit a compact touchscreen.

BRIEF SUMMARY

A method is disclosed for facilitating the selection of graphical objects using a two-finger gesture. In one embodiment, a simultaneous touching of the touchscreen by first and second fingers is sensed, and touch positions of the two fingers are dynamically determined. A selection graphic is displayed on the touchscreen. The selection graphic is dynamically positioned, spaced from the two touch positions and as a function of the two touch positions, in response to a movement of one or both touch positions. A specific graphical object is automatically selected in response to a separate selection input received while the selection graphic is positioned on the specific graphical object.

DETAILED DESCRIPTION

A precision two-finger selection method is disclosed that is implemented on a touchscreen of an electronic device, such as a smartphone or tablet computer. The two-finger selection method may be implemented as a two-finger gesture governed by control logic stored in device memory. In a disclosed example embodiment, a selection graphic (e.g. a selection dot) is displayed in response to sensing a simultaneous touching of the touchscreen by two fingers. The selection dot is dynamically displayed at a position spaced from either of the two touch positions, such as at the midpoint between the two touch positions. A separate selection input, such as a pinch action where the two finger touch points move at greater than a threshold speed or a spacing between the two fingers of less than a threshold distance, initiates the selection of the graphical object on which the selection dot is currently positioned. The selection method simplifies and improves the accuracy of selecting a specific graphical object, such as when the object is too small and/or too close to other objects to be reliably selected by a conventional single-finger touch or tap. The two-finger selection method avoids the need to zoom in to select the graphical object and subsequently zoom out to the previous zoom level.

Figure 1:
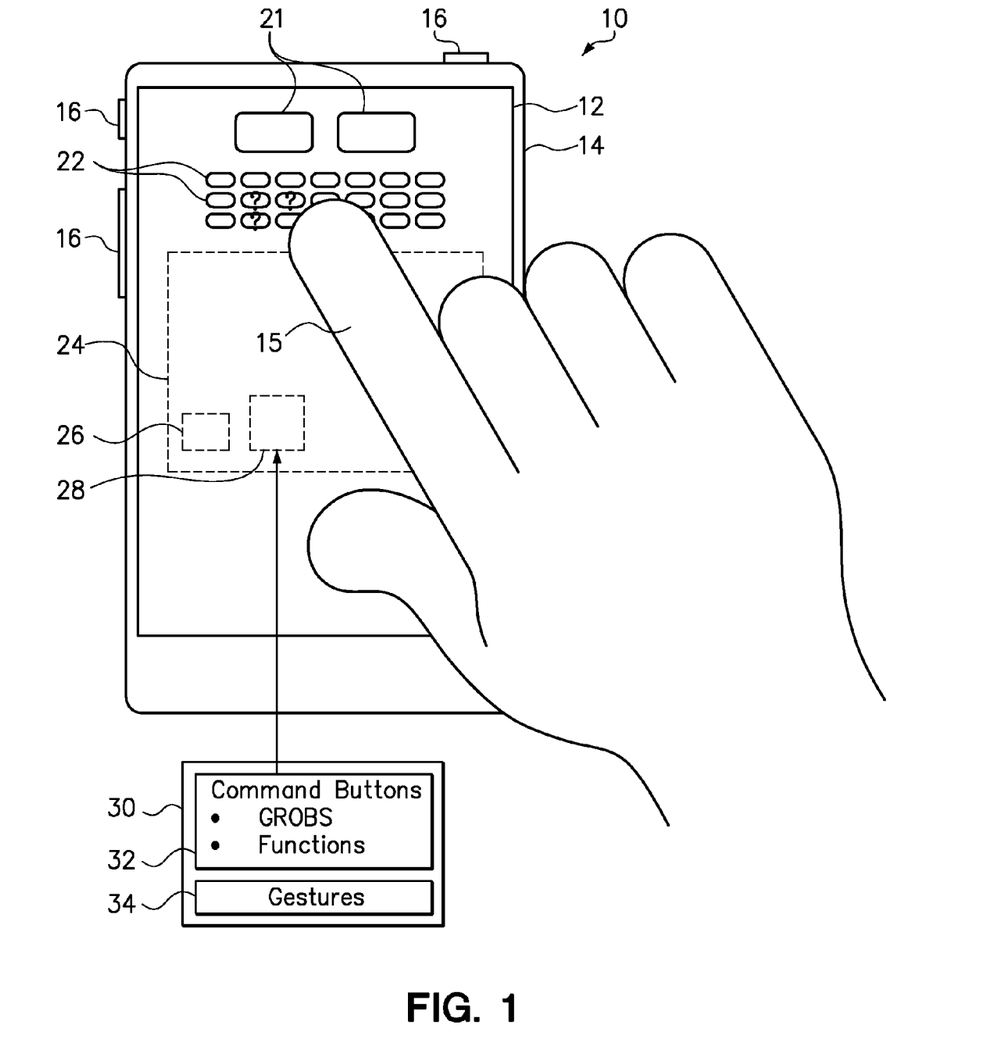
FIG. 1 is a schematic diagram of an electronic device having a touchscreen, specially configured for facilitating the selection of graphical objects.

FIG. 1 is a schematic diagram of an electronic device 10 having a touch-sensitive display screen ("touchscreen") 12, which is specially configured for facilitating the selection of graphical objects. The electronic device 10 may be any of a variety of devices that incorporate the touchscreen 12 as an input/output device, such as a smartphone, tablet computer, or a peripheral display connected to a computer. By way of example, the electronic device 10 in this embodiment is illustrated as a smartphone. The device 10 includes a structural housing 14 that secures the touchscreen 12 and houses internal electronic components of the device 10. The internal electronic components of the device 10 include a circuit board 24, a processor 26, and a memory device 28, which are represented using dashed lines. The control logic 30 is embodied as program code that may be stored on the memory device 28 and selectively retrieved and executed by the processor 26. Various externally-accessible physical buttons 16 are movably secured to the housing 14. The command buttons 21, 22 comprise graphical display objects (GROBs) that may simulate physical buttons. Pressing any of the physical buttons 16 or command buttons 21, 22 generates electronic input for interpretation by the processor 26, as governed by the control logic 30.

The touchscreen 12 may generate visual output using any of a variety of display technologies known in the art, which in a smartphone is typically one of the several variants of an LCD (liquid-crystal display) or LED (light-emitting diode), but in other devices may be a PDP (plasma display panel), or even a CRT (cathode ray tube) type of display. The touchscreen 12 also includes touch-sensitive circuitry for sensing the position at which the display area 14 is touched by a user's finger 15. The touchscreen 12 can sense the positions of more than one finger touching the touchscreen 12 simultaneously. This positional information is registered internally to the device 10 with a controller, which may be included with or in electronic communication with the processor 26. The resolution of the sensed position may be on the order of one pixel width.

The touch-sensitive circuitry may be "built-in" to the touchscreen 12, as is typically the case with smartphones and tablet computers. The touch-sensitive circuitry may alternatively comprise a separate touch-sensitive overlay positioned over a display. Examples of touch-sensitive circuitry include capacitive, resistive, infrared, or surface acoustic wave touchscreen technologies. A capacitive touchscreen includes an insulator, such as glass, coated with a transparent conductor, wherein touching the surface of the panel with a bare finger causes a localized change in capacitance. Surface capacitive technology is one example of a capacitive touchscreen technology wherein a small voltage is applied to one side of the insulator, such that contact with a user's finger forms a dynamically-formed capacitor. Projected capacitive technology is another example of a capacitive technology wherein an X-Y grid pattern of electrodes is formed by etching into the conductive layer. A resistive touchscreen uses inner and outer layers coated with a transparent metal oxide coating, whereby touching the touchscreen causes electrical contact between the inner and outer layers to complete a circuit. An infrared (IR) touchscreen uses an array of X-Y infrared LED beams (source and sensor pairs) that intersect at different locations to identify where the touchscreen is being touched. A surface acoustic wave (SAW) touchscreen uses ultrasonic waves that pass over a panel, such that a portion of the wave is absorbed when the panel is touched. Other suitable touch-sensitive circuitry may also be included.

The touchscreen 12 generates display output in the form of images rendered by the processor 26. The particular display output at any given instant may comprise one or more simultaneously displayed GROBs, each of which may be separately defined or stored in memory 28. Examples of GROBs include individual images, text boxes, and icons, in addition to the command buttons 21, 22. Each GROB may be individually selectable in response to touch input. A particular GROB may be selected to perform an action on the GROB, such as to highlight a particular GROB or to perform a drag-and-drop operation on the selected GROB to move the GROB from one position to another position. A particular GROB may also be selected to perform an action associated with the GROB, such as in the case of a hyperlinked text or a command button. The control logic 30 includes various interactive software applications that may be selectively loaded onto the device 10, and an operating system that supports the interactive software applications. The control logic 30 controls the behavior of the device 10, including how images are to be selectively displayed on the touchscreen 12, and the responses to selections of the GROBs.

The command buttons 21, 22 are provided as an example of interactive GROBs each having an associated function. Command button definitions 32 are included in the control logic 30. The command button definitions 32 include a set of GROBs and their associated functions. The GROBs are defined by one or more appearance parameters that affect how the GROBs appear when displayed on the touchscreen 12. For example, the appearance parameters may include the shape and color of the command buttons 21, 22, and may be customizable according to user input. The current level of "zoom" on the touchscreen 12 dictates the currently displayed size of the command buttons 21, 22. Zooming in may proportionally increase the currently-displayed size of the command buttons 21, 22, while zooming out may proportionally decrease the currently-displayed size of the command buttons 21, 22.

At the current level of zoom, either of the two larger command buttons 21 are large enough relative to the size of the user's finger 15 to be reliably selected by touching the command button 21. The user may touch one of the large command buttons 21 to select that command button, with little chance of inadvertently touching the other large command button 21. However, at the current level of zoom, the size of the smaller command buttons 22 currently displayed are quite small relative to the size of the user's finger 15. The relatively small display size of the command buttons 22 at the current level of zoom creates uncertainty in interpreting a touch to one of these smaller command buttons 22. When attempting to touch a specific one of the smaller command buttons 22, the user's finger 15 is likely to contact more than one of the smaller command buttons 22 simultaneously, and the processor 26 may select a command button 22 other than what the user intended. If desired, the user can zoom-in on the smaller command buttons 22, to proportionately increase their current display size relative to the user's finger 15, which would make it easier for the user to select the intended command button 22 using a single finger 15. However, the user would then have to zoom out to return to the current level of zoom.

As further detailed below, the control logic 30 included with the device 10 alternatively enables a two-finger selection method that simplifies the selection of even relatively small command buttons, while avoiding the need to zoom in. A set of different gesture definitions 34 are provided in the control logic 30. Each gesture definition associates a particular set of touch input criteria with an action. Typical examples of gestures include a sliding of one finger on the touch screen 15 when moving an object, a quick tap to emulate the action of clicking a mouse to select an object, and a double tap to emulate the action of double-clicking a mouse to execute an application associated with an icon. At least one of the gestures 34 that are defined in the system memory 28 is a two-finger gesture governing the selection method described below.

Figure 2:
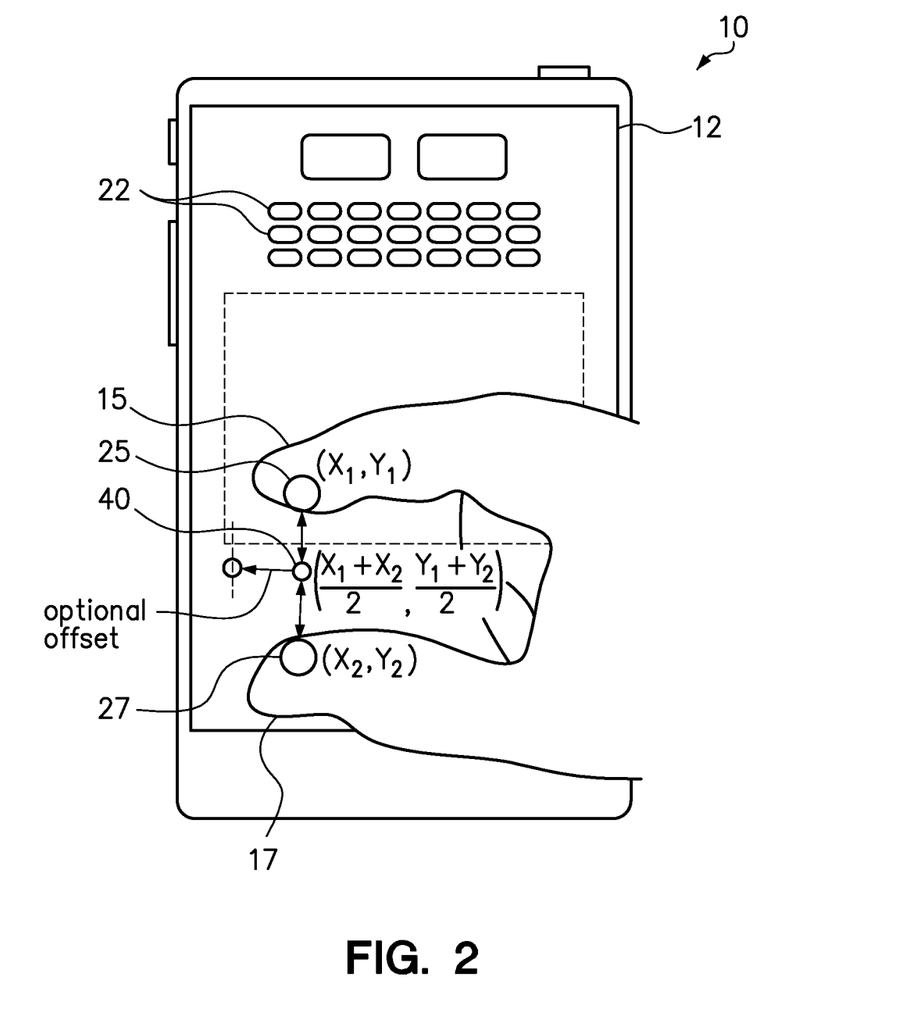
FIG. 2 is a schematic diagram of the electronic device of FIG. 1, illustrating the initiation of a two-finger selection gesture.

FIG. 2 is a schematic diagram of the electronic device 10 of FIG. 1, illustrating the initiation of a two-finger selection gesture. The finger 15 and thumb 17 of one hand are both touching the touchscreen 12. The positions of touch (i.e. touch positions) of the two fingers 15, 17 are represented in the diagram as shaded circles 25, 27 for the purpose of the present discussion, but are preferably not displayed on the touchscreen 12. The touchscreen 12 senses the two touches and dynamically determines the touch positions 25, 27. The touch positions 25, 27 may be interpreted by the touchscreen 12 as being at the center points of the touches (i.e., the center points of the shaded circles). A selection graphic 40 is automatically displayed on the touchscreen 12 in response to the simultaneous touching at the two touch positions 25, 27. The selection graphic 40 in this example is a small, circular graphical object, alternatively referred to as a selection dot 40. The size of the selection graphic 40 (i.e., the diameter where the selection graphic is a dot) may be considerably smaller than the area of contact between the fingers 15, 17 and the touchscreen 12, since a small selection graphic facilitates the precision by which a specific one of the relatively small and closely-spaced command buttons 22 may be selected. The selection graphic 40 is not required to be circular, however, and other shapes may also be suitable for the purpose of selecting a command button 22. Another option is to generate crosshairs, which are intersecting lines, wherein the point of intersection between the lines is used to select a graphical object thereunder. It will be understood that references to a selection dot in the following description is representative of any selection graphic.

The selection dot 40 is dynamically positioned as a function of the two touch positions. The position of the selection dot 40 is dynamically updated in response to movement of one or both touch positions 25, 27. Positioning the selection dot 40 a distance away from the two touch positions makes the selection dot 40 visible while the fingers 25, 27 are in contact with the touchscreen 12. In this example, the selection dot 40 is dynamically positioned equidistant from the two touch positions 25, 27. More specifically, the selection dot 40 is positioned at the midpoint between the two touch positions 25, 27 in this implementation, such that the two touch positions 25, 27 and the selection dot 40 are collinear. The first and second touch positions 25, 27 are represented by the coordinates (x1, y1) and (x2, y2), respectively. A mathematical function may be used to compute the position of the selection dot 40 as ((x1+y1)/2, (y1+y2)/2). This position may be easily computed and updated by the processor. Alternatively, the selection dot 40 could be automatically offset from the midpoint as indicated, so that the selection dot is even less likely to be obscured from view by the two fingers 15, 17. Although alternative coordinate systems or methods for calculating the midpoint between the two touch positions may be used, the above references to x and y are references to the horizontal and vertical coordinates in a Cartesian coordinate system.

The two-finger gesture may be initiated anywhere on the touchscreen 12. As shown in FIG. 2, the user has touched the touchscreen 12 with the two fingers 15, 17 somewhere in the lower, left part of the touchscreen 12. The relative position of the selection dot 40 is at the midpoint between the two touch positions 25, 27, as discussed above. The touch positions 25, 27 place the selection dot 40 on a blank area of the touchscreen 12. However, as the user slides one or both fingers 15, 17 on the touchscreen, the position of the selection dot 40 is dynamically updated to remain at the midpoint between the two touch positions 25, 27. Thus, after placing the user's fingers 15, 17 anywhere on the touchscreen 12 to generate the selection dot 40, the user may then slide and adjust the positions of the two fingers 15, 17 until the selection dot 40 is positioned on a desired one of the command buttons 21, 22. In one option, the selection dot may be offset from the midpoint to make the selection dot more visible due to greater separation from the fingers.

Figure 3:
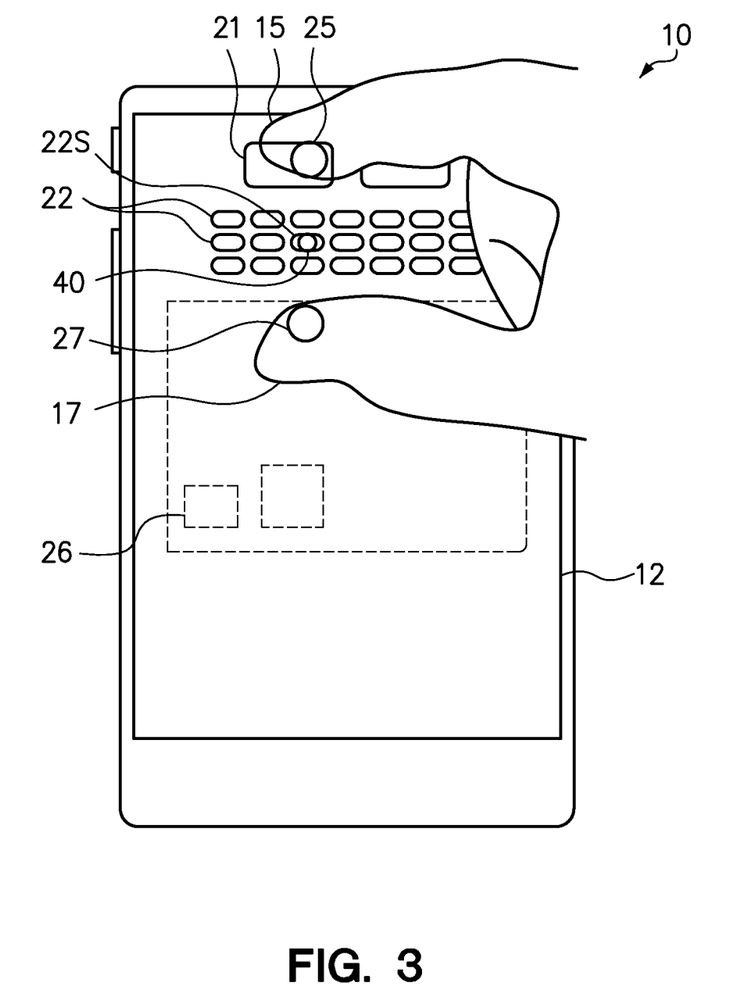
FIG. 3 is a schematic diagram of the electronic device, with the two fingers moved along the touchscreen to position a selection dot over a specific command button.

FIG. 3 is a schematic diagram of the electronic device 10 of FIG. 1, with the two fingers 15, 17 slid along the touchscreen 12 to position the selection dot 40 over a specific one of the smaller command buttons 22, designated 22S. The touch position 25 of the first finger 15 happens to be on one of the other, larger command buttons 21 in FIG. 3. When the two-finger gesture is not in process, a touch to the larger command button 21 would normally initiate a function associated with that command button 21. However, having initiated the two-finger gesture currently in progress allows the processor to ignore the incidental touch to the larger command button 21. This feature allows the user to position the fingers 15, 17 anywhere on the touchscreen 12 without inadvertently selecting one of the other command buttons or other GROBs that the fingers 15, 17 happen to contact. According to the control logic for the two-finger gesture, the processor 26 may identify that the selection dot 40 is positioned over the specific command button 22S. However, the specific command button 22S is preferably not selected until a separate selection input is received while the selection dot is positioned on the specific command button 22S.

Figure 4:
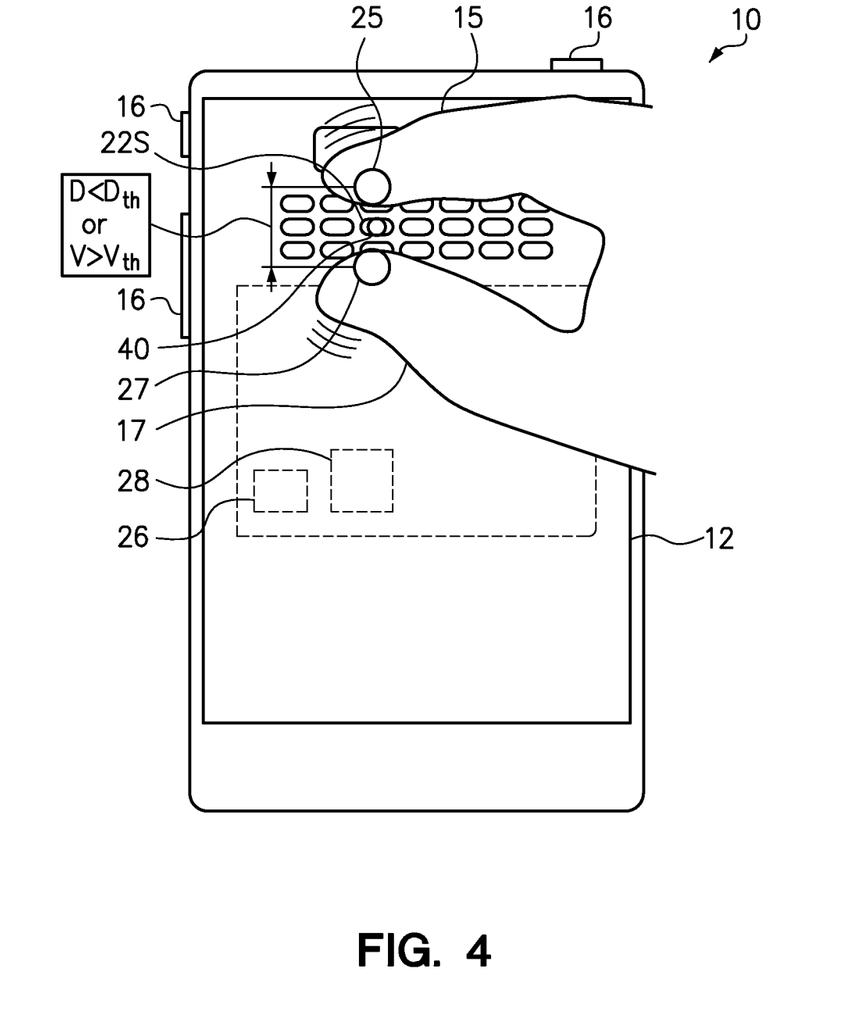
FIG. 4 is a schematic diagram of the electronic device wherein a separate selection input is received to confirm selection of the specific command button.

FIG. 4 is a schematic diagram of the electronic device 10 wherein a separate selection input is received by the processor 26 to confirm selection of the specific command button 22S. The specific command button 22S is selected by the processor 26, according to the control logic of the two-finger gesture, in response to having received the separate selection input while the selection dot 40 is positioned on the specific command button 22S. The positioning of the selection dot over the specific command button 22S is represented in FIG. 4 by shading the selected command button 22S. A visual indication such as the highlighting or shading of the selected command button 22S may also actually be performed on the touchscreen 12, to provide a visual confirmation to the user that the selection dot is positioned over the specific command button 22S. This is similar to a "mouseover" indication.

The separate selection input is provided by the user to indicate an intent to select the specific command button 22S. The separate selection input may take any of a variety of different forms. Two non-limiting examples of a separate selection input are illustrated in FIG. 4 and involve particular movements of the same two fingers 15, 17 used to initiate the selection dot 40. The two fingers 15, 17 are shown as moving toward one another in a "pinch" gesture. One example of a separate selection input that the user may perform is to move the fingers 15, 17 toward one another until a distance "D" between the two touch positions 25, 27 is less than a threshold distance "$D_{th}$". Another example of a separate selection input that the user may perform is to move the fingers 15, 17 toward one another at speed "V" that is greater than a threshold speed "$V_{th}$." If desired, the two-finger gesture may be defined to require both conditions to be present, i.e., $D<D_{th}$ and $V>V_{th}$. Optionally defining the two-finger gesture to require both conditions to be present may increase the certainty of correctly interpreting the gesture as intended selection of the command button 22S.

In the case where the condition $V>V_{th}$ is used as the separate selection input, further control logic could be provided so that the selection dot 40 is not inadvertently moved away from the specific command button 22S when the fingers 15, 17 are moved rapidly together in a pinch. Control logic may be provided to the processor 26 so that when the condition $V>V_{th}$ is present (i.e. when the fingers are moving together rapidly), the selection dot 40 is maintained at its position prior to the condition being met, i.e. before the rapid pinch. That way, a non-uniform pinch would not result in a new position of the selection dot 40 being computed during the rapid pinch.

Other gestures using the two fingers 15, 17 may alternatively be defined to indicate the separate selection input. For example, a "lift and tap" gesture may be defined, wherein after positioning the two fingers 15, 17 to generate the selection dot 40, the first finger 15 is removed from the touchscreen and touches or taps the touchscreen 12 within a predefined radius of the second finger 17 while the second finger remains in contact with the touchscreen. In that case, the processor 26 interprets a removal of the first finger 15 from the touchscreen and another touch within a predefined radius of the second finger 17 while the second finger 17 remains in contact with the touchscreen as the separate selection input.

The separate selection input to indicate an intent to select the specific command button 22S may take the form of actions other than an additional gesture or movement of the two fingers 15, 17. For example, the separate selection input may be the pressing of one of the physical buttons 16 with a third finger (typically of another hand) while the selection dot 40 is positioned over the specific command button 22S. Thus, the user could position the two fingers 15, 17 on the touchscreen 12 to place the selection dot 40 over the specific command buttons 22S, and while still holding the two fingers 15, 17 in contact with the touchscreen 12, the user could press one of the physical buttons 16 with a finger of the other hand.

Figure 5:
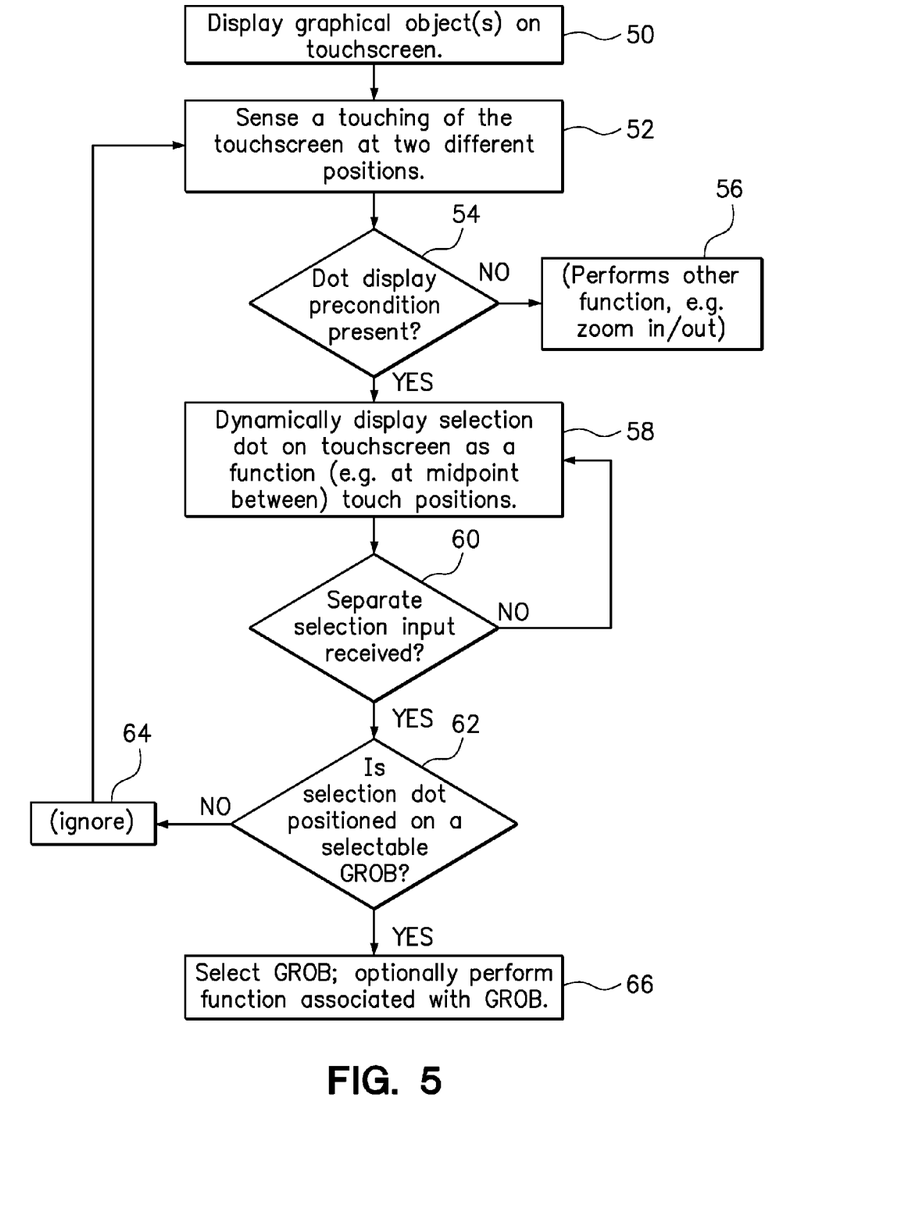
FIG. 5 is a flowchart of an example method that may be implemented on a touchscreen device such as the example device of FIGS. 1-4.

FIG. 5 is a flowchart of an example method that may be implemented on a touchscreen device, such as the device 10 of FIGS. 1-4. Step 50 involves the display of GROBs on a touchscreen. The GROBs may be selectable GROBs, examples of which include text fields, photos, icons, command buttons, and hyperlinked text. Some of the GROBs, such as command buttons and hyperlinked text, may have commands associated with the GROBs. Each GROB may be separately defined in memory and/or separately rendered on the touchscreen. The GROBs may be individually, independently manipulated, such as to move, highlight, or perform a function associated with each GROB.

Various types of touch input to the touchscreen may be interpreted in different ways. The touch input may include one finger, two finger, and three finger gestures, each having a separate gesture definition in memory. There may be more than a plurality of gestures defined for each type. For example, two or more one-finger gestures, two or more two-finger gestures, or two or more three-finger gestures may be defined. Thus, sensing a touch by one, two, or three fingers simultaneously may narrow down which type of gesture is being initiated when a user touches the touchscreen. In step 52, a touching of the touchscreen is sensed at two different positions, simultaneously. This helps narrow the pending gesture to being a two-finger gesture.

Additional criteria are then used to specify a particular gesture. For example, where two touch positions are sensed in step 52, and where more than one two-finger gesture is defined in memory, additional criteria are used to specify a particular one of the two-finger gestures. Conditional step 54 queries whether a dot display precondition is present. When two touch positions have been sensed, the dot display precondition is a criterion the touchscreen device may use to determine that the two-finger selection gesture is intended. The dot display precondition may be an additional input, such as the pressing of a particular key on a keyboard prior to or in conjunction with sensing the simultaneous touching of the display area by two fingers. If the dot display precondition is not present when two touch positions are sensed, then some other two-finger gesture may be initiated per step 56, such as a two-finger pinch or reverse-pinch gesture associated with a zoom function. However, if the dot display precondition is present, step 58 involves dynamically displaying a selection dot on the touchscreen as a function of the two touch positions, such as at a midpoint between the two touch positions.

Conditional step 60 identifies whether a selection input is received. The separate selection input is some sort of input that conveys an intent to select an item, such as a GROB, positioned under the selection dot. This separate selection input may be a pinch at greater than a threshold speed or with the touch positions moving to less than a threshold distance apart, as described with reference to FIG. 4. Other selection input may be the lift and tap gesture or the pressing of a physical or virtual button, as also described above. If the separate selection input is received per conditional step 60, conditional step 62 identifies whether the selection dot is positioned over a selectable GROB when the separate selection input is received. For a GROB to be selected according to the two-finger gesture, the separate selection input must be received when the selection dot is positioned over a selectable GROB. For example, if the selection dot is positioned over an empty portion of the touchscreen, then there is nothing to select when the selection input is received, and the separate selection input may be ignored per step 64.

If a separate selection input is received per step 60 and a selection dot is positioned on a selectable GROB when the separate selection input is received per step 62, then step 66 involves selecting the GROB on which the selection dot was placed at the time the separate selection input was received. For some selectable GROBs, selecting the GROB may simply highlight the GROB, such as for a drag-and-drop action or for generating a context menu associated with the GROB. Other selectable GROBs may have an associated function, such as a command button or hyperlinked text, in which case selecting the GROB per step 66 initiates a function associated with the GROB.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   sensing a simultaneous touching of a touchscreen by first and second fingers and dynamically determining touch positions of the two fingers;
   displaying a selection graphic on the touchscreen and dynamically positioning the selection graphic as a function of the two touch positions in response to a movement of one or both touch positions;
   interpreting a movement of the two fingers toward one another to less than a threshold distance apart as a separate selection input; and
   automatically selecting a specific graphical object in response to the separate selection input received while the selection graphic is positioned on the specific graphical object.

2. The method of claim 1, further comprising:
   executing a command function associated with the specific graphical object in response to selecting the specific graphical object.

3. The method of claim 1, wherein the step of dynamically positioning the selection graphic as a function of the two touch positions comprises:

positioning the selection graphic on the touchscreen equidistant from the two touch positions.

4. The method of claim 3, further comprising:
positioning the selection graphic on the touchscreen at a midpoint between the two touch positions.

5. The method of claim 3, further comprising:
positioning the selection graphic on the touchscreen at a position offset from a midpoint between the two touch positions.

6. The method of claim 1, further comprising:
interpreting a movement of the two fingers toward one another above a threshold speed as the separate selection input.

7. The method of claim 1, further comprising:
interpreting a removal of the first finger from the touchscreen and another touch within a predefined radius of the second finger while the second finger remains in contact with the touchscreen as the separate selection input.

8. The method of claim 1, further comprising:
performing the step of displaying the selection graphic on the touchscreen only during periods when a pre-specified dot display precondition is present; and
during periods when the pre-specified dot display precondition is not present, performing a zoom function in response to the movement of one or both touch positions.

9. The method of claim 8, wherein the specified dot display precondition comprises the pressing of a keyboard button prior to sensing the simultaneous touching of the touchscreen by the first and second fingers.

10. A computer program product including computer usable program code embodied on a non-transitory computer usable storage medium, the computer program product comprising:
computer usable program code for sensing a simultaneous touching of a touchscreen by first and second fingers and dynamically determining touch positions of the two fingers;
computer usable program code for displaying a selection graphic on the touchscreen and dynamically positioning the selection graphic as a function of the two touch positions in response to a movement of one or both touch positions;
computer usable program code for interpreting a movement of the two fingers toward one another to less than a threshold distance apart as the separate selection input; and
computer usable program code for automatically selecting a specific graphical object in response to the separate selection input received while the selection graphic is positioned on the specific graphical object.

11. The computer program product of claim 10, further comprising:
computer usable program code for executing a command function associated with the specific graphical object in response to selecting the specific graphical object.

12. The computer program product of claim 10, wherein the computer usable program code for dynamically positioning the selection graphic as a function of the two touch positions comprises:
computer usable program code for positioning the selection graphic on the touchscreen equidistant from the two touch positions.

13. The computer program product of claim 12, further comprising:
computer usable program code for positioning the selection graphic on the touchscreen at a midpoint between the two touch positions.

14. The computer program product of claim 12, further comprising:
computer usable program code for positioning the selection graphic on the touchscreen at a position offset from a midpoint between the two touch positions.

15. The computer program product of claim 10, further comprising:
computer usable program code for interpreting a movement of the two fingers toward one another above a threshold speed as the separate selection input.

16. The computer program product of claim 10, further comprising:
computer usable program code for interpreting a removal of the first finger from the touchscreen and another touch within a predefined radius of the second finger while the second finger remains in contact with the touchscreen as the separate selection input.

17. The computer program product of claim 10, further comprising:
computer usable program code for performing the step of displaying the selection graphic on the touchscreen only during periods when a pre-specified dot display precondition is present; and
computer usable program code for performing a zoom function in response to the movement of one or both touch positions during periods when the pre-specified dot display precondition is not present.

18. The computer program product of claim 17, wherein the specified dot display precondition comprises the pressing of a keyboard button prior to sensing the simultaneous touching of the touchscreen by the first and second fingers.

* * * * *